United States Patent Office 3,304,153
Patented Feb. 14, 1967

3,304,153
METHOD OF PREPARING MAGNESIA SPINEL
Wate Thewis Bakker and James Gordon Lindsay, Arvida, Quebec, Canada, assignors to Aluminium Laboratories Limited, Montreal, Quebec, Canada, a corporation of Canada
No Drawing. Filed Nov. 12, 1965, Ser. No. 507,568
15 Claims. (Cl. 23—52)

This is a continuation-in-part of patent application Ser. No. 273,310, filed April 16, 1963.

This invention relates to magnesia spinels. More particularly, this invention relates to synthetic magnesium aluminate spinel and to refractory products made therefrom. Still more particularly, this invention relates to an improved method of preparing magnesia spinels, particularly magnesium aluminate spinel having a relatively high reactivity.

The term spinel or magnesia spinel is used herein to identify magnesium aluminate spinel having the composition $MgO.Al_2O_3$.

Various methods are known for the preparation of magnesia spinels. The usual commercial practice in the ceramic industry for the production of magnesia spinel involves a two stage process. In the first stage a finely ground admixture of magnesia and alumina is calcined at a temperature of about 1600° C. to convert the admixture to magnesia spinel, the magnesia and alumina being present in the admixture in substantially stoichiometric proportions. In the second stage the calcined admixture containing magnesia spinel is reground and formed into the desired ceramic shapes and refired or calcined at a temperature in excess of 1800° C. to form a dense, substantially non-porous magnesia spinel refractory body.

Another method known for the production of magnesia spinel involves forming an intimate, finely divided, homogeneous admixture of magnesium hydroxide or hydrate, $Mg(OH)_2$, and aluminum hydroxide or hydrate, $Al(OH)_3$, and calcining the resulting admixture at a relatively high temperature, about 1650° C. This method of preparing magnesia spinel from an admixture of magnesium hydroxide and aluminum hydroxide is more completely described in U.S. Patent 2,805,167.

It is an object of this invention to provide an improved magnesia spinel characterized by a relatively high reactivity and/or fired density. The relatively high reactivity of the magnesia spinels prepared in accordance with this invention permits the formation of magnesia spinel-containing ceramic bodies which can be densified at firing temperatures as low as 1600° C. to yield a nonporous refractory magnesia spinel product possessing a density in excess of 3.45 grams per cubic centimeter, the theoretical density of magnesia spinel being taken as 3.58 grams per cubic centimeter.

Another object of this invention is to provide an improved method of preparing magnesia spinels involving solid state reaction between MgO and $Al_2O_3$.

Still another object of this invention is to provide a method for the production of magnesia spinels involving a relatively low calcining or converting temperature, as low as about 850° C., a temperature sufficiently low that sintering does not occur to any appreciable extent, thus the resulting magnesia spinel can be easily ground to micron dimensions.

Yet another object of this invention is to provide a method for the production of an improved magnesia spinel product useful as a bonding agent in refractories, such as in refractories wherein the presence of magnesia spinel is advantageous in order to impart resistance to metal attack, e.g. refractories for use in remelt furnaces for melting high magnesium content aluminum alloys.

Yet another object of this invention is to provide a method for the preparation of improved synthetic magnesia spinel powder useful as a raw material for the manufacture of magnesia spinel ceramics and grog material for spinel refractories and as a bonding agent in refractories.

How these and other objects of this invention are accomplished will become apparent in view of the accompanying disclosure.

In accordance with this invention it has now been discovered that an improved method of preparing magnesia spinel, particularly magnesium aluminate spinel, having the formula $MgO.Al_2O_3$ is provided by preparing an admixture of a finely divided alumina-contributing component and a finely divided magnesia-contributing component in substantially equimolecular or stoichiometric proportions and calcining the resulting admixture at a temperature in the range from about 850° C. to about 1250° C.

In the practice of this invention the alumina-contributing component employed in the admixture is selected from the group consisting of alumina hydrate, such as alumina trihydrate, lightly calcined alumina, and alpha-alumina or mixtures thereof and the magnesia-contributing component is selected from the group consisting of magnesium hydroxide, magnesium carbonate, basic magnesium carbonate and lightly calcined magnesium oxide (including lightly calcined, e.g. 900° C. magnesium carbonate) or mixtures thereof. Additionally, there is present in the admixture when the alumina-contributing component is substantially free of alpha-alumina a minor amount by weight of aluminum fluoride or equivalent fluorine-containing material capable, such as in the presence of moisture, of liberating hydrogen fluoride during the conversion of calcining operation, such as an amount in the range from about 0.2 to about 4.0% by weight, oxide basis. Accordingly, if the bulk of the alumina is in the alpha form the aluminum fluoride or aforesaid fluorine-containing material should not be used. By lightly calcined alumina is meant alumina hydrate which has been calcined at a sufficiently high temperature to drive off essentially all its water but not enough to convert it to alpha-alumina.

More particularly, in the preparation of magnesia spinels in accordance with this invention the alumina-contributing component and the magnesia-contributing compoent are finely divided, preferably such that 40% by weight of the alumina-contributing component particles have a particle size less than 10 microns and preferably such that 90% by weight of the magnesia-contributing component particles have a particle size less than 10 microns, and are intimately admixed to form a substantially homogeneous admixture of these solids in dry, pressed cake or slurry form. Further, it has been observed that the influence of the crystal form of the alumina-contributing component in the admixture employed for the preparation of the magnesia spinel is important. Specifically, if the alumina-contributing component is in the form of alumina hydrate or lightly calcined alumina, the addition of from about 0.2 to about 4.0% by weight aluminum fluoride or its equivalent on an oxide basis is necessary to the admixture in order to give a sufficient conversion of the admixture at a low temperature to provide a magnesia spinel product of high reactivity. When, however, the alumina-contributing component is in the form of alpha-alumina, otherwise known as corundum, the presence of aluminum fluoride or its equivalent in the admixture is not only unnecessary but even harmful as it promotes sintering of the admixture at relatively low temperatures. Alumina hydrate and lightly calcined alumina are preferred in the practice of this invention as the alumina-contributing component in the presence of added aluminum fluoride.

As indicated, the magnesia-contributing component is in the form of magnesium hydroxide, magnesium carbonate, basic magnesium carbonate or lightly calcined magnesium oxide. Dead burned magnesia or magnesium oxide is less desirable since it generally exhibits low reactivity. A slight excess of MgO in the admixture with the alumina-contributing component is desirable to avoid accidental formation of non-stoichiometric alumina rich spinel, MgO itself being insoluble in magnesia spinel.

In the conversion or calcining operation wherein the admixture of alumina-contributing component and the magnesia-contributing component is heat treated to form the desired magnesia spinel product, too low a calcining or heat treatment temperature gives incomplete conversion of the admixture to magnesia spinel. Also, too high a calcining or heat treatment temperature leads to crystal growth and sintering of the newly-formed magnesia spinel which causes a lowering of the reactivity of the spinel product. Generally, satisfactory results have been obtained by employing a calcining temperature in the range 850–900° C. to 1250° C. and tests results indicate that a calcining temperature of about 1050° C. is preferred.

An advantage of the practice of this invention is due to the completion of the solid state reaction between MgO and $Al_2O_3$ to form $MgAl_2O_4$, magnesia spinel, at a sufficiently low temperature so that sintering of the material being treated does not occur to any appreciable extent with the result that the magnesia spinel thus prepared is very easily ground to micron dimensions. The prior art techniques for preparing magnesia spinel result in the preparation of a sintered magnesia spinel. Sintered magnesia spinel is difficult to grind and it is necessary to grind it down to micron dimensions if it is to be used as a ceramic material in slip casting or other fabricating techniques.

Illustrative of the aforementioned advantage of the practice of this invention 500 gms. of magnesia spinel prepared in accordance with this invention were ground by means of 3500 gms. of high alumina balls in a 1.35 gal. porcelain jar mill for 3 hours at 60 r.p.m. The resulting ground magnesia spinel had the following size distribution:

| Size in microns: | Percent by wt. greater than size indicated |
|---|---|
| 10 | 8 |
| 5 | 26 |
| 3 | 47 |
| 2 | 63 |
| 1 | 87 |
| 0.5 | 97 |
| 0.3 | 100 |

The following examples are illustrative of the practices of this invention and the advantages obtainable therefrom.

*Example No. 1*

Mixtures of magnesium hydroxide, prepared from the mineral brucite, and alumina trihydrate, prepared according to the Bayer process, were employed. These materials had the following chemical analyses:

TABLE I.—ANALYSES OF MATERIALS USED

| Oxide | $Mg(OH)_2$ (percent) | | $Al_2O_3·3H_2O$ (percent) | |
|---|---|---|---|---|
| | As is | Calcined basis | As is | Calcined basis |
| $Al_2O_3$ | | | 65.6 | 99.35 |
| $SiO_2$ | 0.2 | 0.3 | 0.02 | 0.03 |
| $Fe_2O_3$ | 0.9 | 1.3 | 0.02 | 0.035 |
| MgO | 68.0 | 97.1 | | |
| $Na_2O$ | | | 0.36 | 0.55 |
| CaO | 0.9 | 1.3 | | |
| Loss on Ignition | 30.0 | | 34 | |

The alumina to magnesia ratio of the mixture was designed to provide stoichiometric magnesia spinel ($Al_2O_3$/MgO ratio 2.55). To avoid incidental formation of alumina rich spinel a small excess of MgO was present in the mix. Excess MgO is insoluble in magnesia spinel and may be leached out with dilute HCl after calcination if so desired.

The mixture of raw materials was ground in a laboratory jar mill. Varying amounts of $AlF_3$ were added prior to grinding. The ground mixture was pressed into briquettes measuring 4 x 1 x 1¼ inch at 4000 p.s.i. The briquettes were calcined at temperatures ranging from 700 to 1400° C.

The products obtained were analyzed by X-ray diffraction techniques to reveal their mineral composition. No appreciable amounts of spinel were found at temperatures substantially below 900° C. At 900° C. or higher the conversion to spinel was found to be practically complete.

The calcined materials were reground in a laboratory jar mill, pressed into one-inch diameter discs and fired for 1 hour at 1600° C. The fired density at 1600° C. may serve as a measure for the reactivity of the product. The higher the fired density the greater the reactivity. Table II gives X-ray diffraction and fired density data of the samples as a function of calcination temperature. Table III gives the fired density as a function of fluoride content at a calcination temperature of 1050° C.

From the data presented in Tables II and III it is clear that magnesia spinel with optimum properties can be obtained by calcining a mixture of alumina trihydrate and magnesium hydroxide at 900–1200° C., using 0.2–4% $AlF_3$ as a mineralizer.

TABLE II.—COMPOSITION, FIRED AND GREEN DENSITIES OF MAGNESIA SPINEL BODIES [1]

| Calcination | X-Ray Diff. Line Intensity [2] | | Green Density, g./cm³ | Fired Density (1,600° C.), g./cm³ |
|---|---|---|---|---|
| | Spinel d=2.86 A. | Periclase d=2.11 A. | | |
| 700 | 2 | 66 | 1.41 | 2.46 |
| 800 | 0 | 72 | 1.50 | 2.97 |
| 900 | 82 | 6 | 2.13 | 3.50 |
| 1,000 | 98 | 1 | 2.12 | 3.50 |
| 1,050 | 97 | 5 | 2.14 | 3.51 |
| 1,100 | 105 | 1 | 2.18 | 3.49 |
| 1,200 | 112 | 2 | 2.17 | 3.50 |
| 1,400 | 128 | 3 | 2.20 | 3.30 |

[1] Spinel prepared by calcining aluminum hydrate and magnesium hydroxide containing 1% $AlF_3$ at the temperatures indicated.
[2] Line intensities comparable from sample to sample, but not from mineral to mineral.

TABLE III.—FIRED AND GREEN DENSITIES OF MAGNESIA SPINEL BODIES [1]

| Percent $AlF_3$ Oxide Basis | Green Density, g./cm³ | Fired Density (1,600° C.), g./cm³ |
|---|---|---|
| 0 | 1.75 | 3.37 |
| 0.2 | 2.09 | 3.49 |
| 0.5 | 2.00 | 3.49 |
| 1.0 | 2.14 | 3.51 |
| 1.5 | 2.12 | 3.52 |
| 2.5 | 2.11 | 3.47 |
| 4 | 2.17 | 3.43 |
| 7 | 2.07 | 3.38 |
| 10 | 2.12 | 3.25 |

[1] Spinel prepared by calcining alumina hydrate and magnesium hydroxide at 1,050° C. using various amounts of $AlF_3$ as indicated.

From the data presented in Tables II and III it is clear that a magnesia spinel with optimum properties can be obtained by calcining a mixture of alumina hydrate and magnesium hydroxide at 1050° C. using 0.2–4% $AlF_3$ as a mineralizer.

*Example No. 2*

Mixtures of recrystallized alumina (i.e. consisting chiefly of corundum), obtained from a hydrate made by the Bayer process, and magnesium oxide obtained by calcining the magnesium hydroxide identified in Example No. 1 at 900° C. for 2 hours were prepared. The mixtures were ground for 3 hours in a laboratory jar mill. To one of the mixtures 1.5% $AlF_3$ was added. The ground mixtures were pressed into briquettes and calcined at 1050° C. X-ray diffraction analysis showed that the calcined products consisted chiefly of magnesia spinel with minor amounts of periclase and corundum. The calcined products were crushed, reground for 4 hours in a ball mill and again pressed into briquettes and fired at 1600° C. for 1 hour. Table IV gives the fired and green densities of the pressed materials. It is clear from the data that the use of $AlF_3$ is disadvantageous in this case.

TABLE IV.—FIRED AND GREEN DENSITIES OF MAGNESIA SPINEL BODIES [1]

| Percent $AlF_3$ | Green Density, g./cm.$^3$ | Fired Density (1,600° C.), g./cm.$^3$ |
| --- | --- | --- |
| 0 | 2.22 | 3.50 |
| 1.5 | 2.28 | 3.25 |

[1] Spinel prepared by calcining aluminum oxide (corundum) and magnesium oxide at 1,050° C.

*Example No. 3*

This example illustrates the use of magnesia spinel in spinel ceramics. The main advantage of the new product prepared in accordance with this invention is the possibility of lowering the firing temperature by approximately 200 degrees centigrade, i.e. in the range 1600–1700° C., to obtain a substantially fully, about 97–98%, densified product. (See data of Example Nos. 1 and 2.) Also, spinel ceramics produced from the new product appeared to possess excellent strength properties, generally exceeding the strength figures quoted in the literature for spinel.[4] Table V gives some strength data for some magnesia spinel bars prepared in accordance with this invention.

TABLE V.—TRAVERSE BREAKING STRENGTH OF SOME MAGNESIA SPINEL RODS

| Composition | Calcining Temp., °C. | Firing Temp., °C. | Fired Density, g./cm.$^3$ | Modulus of rupture, p.s.i. |
| --- | --- | --- | --- | --- |
| $Al_2O_3 \cdot 3H_2O$, $Mg(OH)_2$, 1.5% $AlF_3$ | 1,100 | 1,650 | 3.46 | 29,000 |
| $Al_2O_3$ (lightly calcined), MgO (lightly calcined), 1.5% $AlF_3$ | 1,100 | 1,650 | 3.41 | 26,000 |
| $Al_2O_3 \cdot 3H_2O$, $Mg(OH)_2$, 0.5% $AlF_3$ | 1,050 | 1,600 | 3.49 | 26,000 |
| $Al_2O_3 \cdot 3H_2O$ $Mg(OH)_2$, 4% $AlF_3$ | 1,050 | 1,600 | 3.42 | 24,000 |

*Example No. 4*

This example is illustrative of the use of the new magnesia spinel of this invention as a binder in high purity refractories. Spinel bricks were prepared using dense sintered spinel (prepared from the reactive magnesia spinel described in Example No. 1) as a grog with reactive magnesia spinel as a binder. The grog size formula for the bricks used is as follows: 8 x 20 mesh≈40%, 20 x 65 mesh≈14%, 65 x 325 mesh≈17%, −325 mesh≈12%, reactive spinel≈17%. To this mixture about 5% of a concentrated $MgCl_2$ solution containing 340 g./l. $MgCl_2$ was added. The bricks were formed by dry-pressing at 4000 p.s.i. and fired at temperatures in the range of 1300–1400° C., 1300° C. being the minimum temperature. The resulting burnt bricks showed excellent mechanical and ceramic properties.

Density _____ g./cm.$^3$ 2.75–3.00
Apparent porosity _____ percent 15–20
Modulus of rupture _____ p.s.i. 3000–4000

[4] W. D. Kingery, Introduction to Ceramics, page 610, Table 17.2. John Wiley and Sons, New York, London, 1960.

The spread in the values is due to averaging the results of a number of test specimens of varying grog size distribution. Actually bricks made with the grog size distribution quoted gave modulus of rupture values on the high side of the above range. The magnesia spinel so prepared proved to be chemically stable against attack by molten aluminum alloys containing 2–8% magnesia.

Although emphasis has been placed on the use of $AlF_3$ as the mineralizer, other equivalent fluorine-containing compounds capable of liberating hydrogen fluoride, during the conversion or calcining operation are also useful. Other fluorine-containing compounds useful in the practice of this invention, i.e. pyrohydrolyzable fluorine-containing compounds capable of yielding HF during high temperature calcining, include, in addition to hydrogen fluoride, fluorine, ammonium fluoride, calcium fluoride, and the like.

Presently available conventional commercial spinels are dense. However, whether produced by arc furnace fusion or by sintering in one or more firings, these spinels are not readily suitable for the production of precision ceramic shapes. To render these spinels suitable for such purposes the dense spinel must be crushed and ground, often acid leached, before being pressed and fired at temperatures of 1800° C. and higher.

In accordance with this invention there is produced a spinel powder capable of being further processed to a dense spinel on firing at a relatively lower temperature, about 1600° C. Illustrative of the special properties of the spinel prepared herein, an analogy may be drawn with the Bayer calcined aluminas and the dense sintered tabular aluminas used in the ceramic industry. Whereas tabular alumina makes a suitable dense grog for refractories it must be finely ground before it can be sintered. Bayer calcined ceramic grade alumina is a fine powder readily grindable to micron dimensions. It can be pressed into the desired shape and fired to zero porosity at temperatures of 1600° C. and up with shrinkages in the range 11–20%. Just as commercial dense spinel is similar in its physical state to tabular alumina, the spinel powder of this invention corresponds to Bayer alumina. Moreover, it corresponds to a highly reactive alumina since it sinters at a lower temperature. Like Bayer aluminas it must be found to develop its reactivity. This is easily done since the spinel compacts of this invention as produced are soft and friable. After grinding it can be pressed and fired to zero porosity at 1600° C. and densification to 97% of theoretical density occurs with a relatively low shrinkage, about 17%, a desirable ceramic property.

As will be apparent to those skilled in the art in the light of the foregoing disclosure, many modifications, alterations and substitutions are possible in the practice of this invention without departing from the spirit or scope thereof.

We claim:
1. A method of preparing a magnesia spinel which comprises preparing a homogeneous admixture consisting essentially of a finely-divided alumina-contributing component and a finely-divided magnesia-contributing component, said alumina-contributing component and said magnesia-contributing component being present in said admixture in substantially stoichiometric amounts, said alumina-contributing component being selected from the group consisting of alumina hydrate, lightly calcined alumina and alpha-alumina, and said magnesia-contributing component being selected from the group consisting of magnesium hydroxide, magnesium carbonate, basic magnesium carbonate and lightly calcined magnesium oxide, said admixture additionally containing a minor amount of a fluorine-containing material in the range 0.2–4.0% by weight, oxide basis, when said alumina-contributing component is substantially free of alpha-alumina, calcining said admixture at a temperature in the range from about 850° C. to about 1250° C. and recovering the resulting calcined reaction product consisting chiefly of magnesia spinel, said fluorine-containing material being capable of liberating hydrogen fluoride during the calcining operation.

2. A method in accordance with claim 1 wherein said fluorine-containing material is aluminum fluoride.

3. A method in accordance with claim 1 wherein said alumina-contributing component is alumina hydrate.

4. A method in accordance with claim 1 wherein said magnesia-contributing component is magnesium hydroxide.

5. A method in accordance with claim 1 wherein said alumina-contributing component is alumina hydrate and wherein said magnesia-contributing component is magnesium hydroxide.

6. A method in accordance with claim 1 wherein said alumina-contributing component is alpha-alumina.

7. A method in accordance with claim 1 wherein said magnesia-contributing component is lightly calcined magnesium oxide.

8. A method in accordance with claim 1 wherein said alumina-contributing component is alumina hydrate and wherein said magnesia-contributing component is lightly calcined magnesium oxide.

9. A method in accordance with claim 1 wherein said alumina-contributing component is alpha-alumina and wherein said magnesia-contributing component is lightly calcined magnesium oxide.

10. A method in accordance with claim 1 wherein said admixture is calcined at a temperature of about 1050° C.

11. A method in accordance with claim 1 wherein said alumina-contributing component is alumina hydrate, wherein said magnesia-contributing component is magnesium hydroxide and wherein aluminum fluoride is present in said admixture in an amount of about 1.5% by weight, oxide basis.

12. A method in accordance with claim 1 wherein said alumina-contributing component is lightly calcined alumina, wherein said magnesia-contributing component is lightly calcined magnesium oxide and wherein said aluminum fluoride is present in said admixture in an amount of about 1.5% by weight, oxide basis.

13. A method in accordance with claim 1 wherein said alumina-contributing component is alumina hydrate, wherein said magnesia-contributing component is magnesium hydroxide and wherein said aluminum fluoride is present in said admixture in an amount of about 0.5% by weight, oxide basis.

14. A method in accordance with claim 1 wherein said alumina-contributing component is lightly calcined alumina hydrate, wherein said magnesia-contributing component is magnesium hydroxide and wherein said aluminum fluoride is present in said admixture in an amount of about 4% by weight, oxide basis.

15. A method of preparing a magnesia spinel which comprises preparing a homogeneous admixture consisting essentially of a finely-divided alumina-contributing component and a finely-divided magnesia-contributing component, said alumina-contributing component and said magnesia-contributing component being present in said admixture in substantially stoichiometric amounts, said alumina-contributing component being selected from the group consisting of alumina hydrate, lightly calcined alumina and alpha-alumina and mixtures thereof and said magnesia-contributing component being selected from the group consisting of magnesium hydroxide, magnesium carbonate, basic magnesium carbonate and lightly calcined magnesium oxide and mixtures thereof, said admixture additionally containing a minor amount of a fluorine-containing material in the range 0.2–4.0% by weight, oxide basis, when said alumina-contributing component is substantially free of alpha-alumina, calcining said admixture at a temperature of about 1050° C. and recovering the resulting calcined reaction product consisting chiefly of magnesia spinel having a relatively high reactivity, said fluorine-containing material being capable of liberating hydrogen fluoride during the calcining operation.

References Cited by the Examiner

UNITED STATES PATENTS

| | | | |
|---|---|---|---|
| 2,805,167 | 9/1957 | McCreight et al. | 23—52 |
| 3,083,123 | 3/1963 | Navias | 23—52 X |
| 3,106,447 | 10/1963 | Charvat | 23—52 |
| 3,155,534 | 11/1964 | Bruck | 106—62 X |

OTHER REFERENCES

Newsome et al.: Alumina Properties, Technical Paper No. 10, 2nd Revision, 1960, Aluminum Co. of America, Pittsburgh, Pa.

Remy: Treatise on Inorganic Chemistry, vol. 2, 1956, Elsevier Publishing Co., New York, pages 743–748.

OSCAR R. VERTIZ, *Primary Examiner.*

H. T. CARTER, *Assistant Examiner.*